July 14, 1970 R. W. BIXBY 3,520,188
BATHYTHERMOGRAPH DEVICE

Filed Feb. 7, 1968 2 Sheets-Sheet 1

INVENTOR
RICHARD W. BIXBY
BY
Nolte & Nolte
ATTORNEY

United States Patent Office 3,520,188
Patented July 14, 1970

3,520,188
BATHYTHERMOGRAPH DEVICE
Richard W. Bixby, Little Compton, R.I., assignor to Buzzards Corp., Marion, Mass., a corporation of Massachusetts
Continuation-in-part of application Ser. No. 591,616, Nov. 2, 1966. This application Feb. 7, 1968, Ser. No. 706,745
Int. Cl. G01k 7/02
U.S. Cl. 73—344    7 Claims

ABSTRACT OF THE DISCLOSURE

A bathythermograph probe adapted to be released from a submerged vessel, such as a submarine, includes a chamber having a positive buoyancy affixed to the probe by a pressure responsive mechanical latch, so that the probe is unlatched from the chamber at the depth of the vessel, and is released from the chamber at a lesser depth for descent in the water.

---

This invention relates to bathythermograph probes and more specifically to a device for releasing an expendable bathythermograph probe from an undersea vehicle such as a submarine.

This application is a continuation-in-part of copending application Ser. No. 591,616, filed Nov. 2, 1966, now abandoned.

A primary object of the present invention is to provide a device for releasing expendable bathythermograph probes from undersea vehicles.

Another object of the present invention is to provide a device which will release an expendable bathythermograph probe independent of external adjustment by launching personnel.

A further object is to provide a mechanical structure which rigidly holds a bathythermograph probe and float together, independent of external housing, during storage, shipment and handling.

A still further object of the present invention is to provide a mechanical structure which retains a bathythermograph probe and float together until being subjected to a predetermined hydrostatic pressure.

A still further object of the invention is to provide a release device in which the release force is independent of the sliding friction of seal means.

Another object of the present invention is to provide apparatus for measuring and recording a property of a fluid wherein a canister is releasably secured to a float chamber, said float chamber separable in two pieces and adapted to carry a bathythermograph probe, the canister containing two spools of a continuous wire adapted to be payed out from said spools such that the wire will undergo little or no longitudinal stress.

The present invention fulfills the aforementioned objects and overcomes limitations and disadvantages of prior art devices by providing an ascent assembly having a positive buoyancy and in which a mechanical structure and latch rigidly holds a bathythermograph probe and float together, independent of an external housing, during storage, shipment and handling. The latch and holding structure is retained until after release from a launching device. It is then inactivated by the fluid pressure, readying a float release mechanism for operation upon reaching a predetermined and desired depth during ascent.

In another embodiment of the present invention the canister encloses a stationary spool and an intermediary spool of continuous wire. The canister is removably secured to a two-piece molded glass pressure vessel which constitutes a float chamber and houses a bathythermograph probe. During storage or shipment or prior to use, a spring member exerts radial pressure on the inside wall of the glass pressure vessel such that protrusions on the end of pressure vessel extend outward and into apertures formed in the canister.

Figure 1:
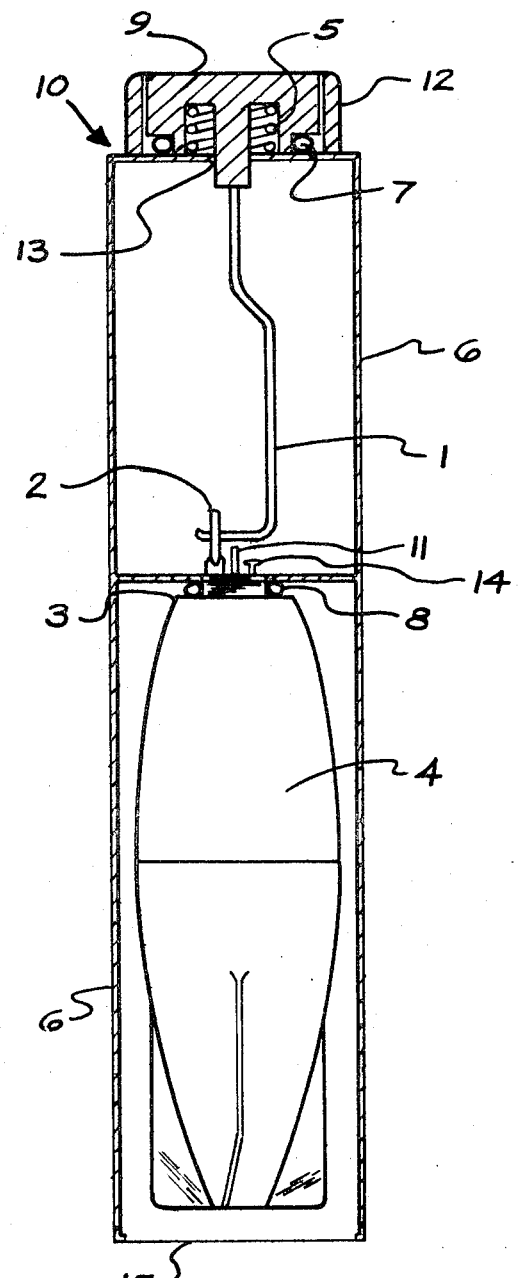
Figure 2:
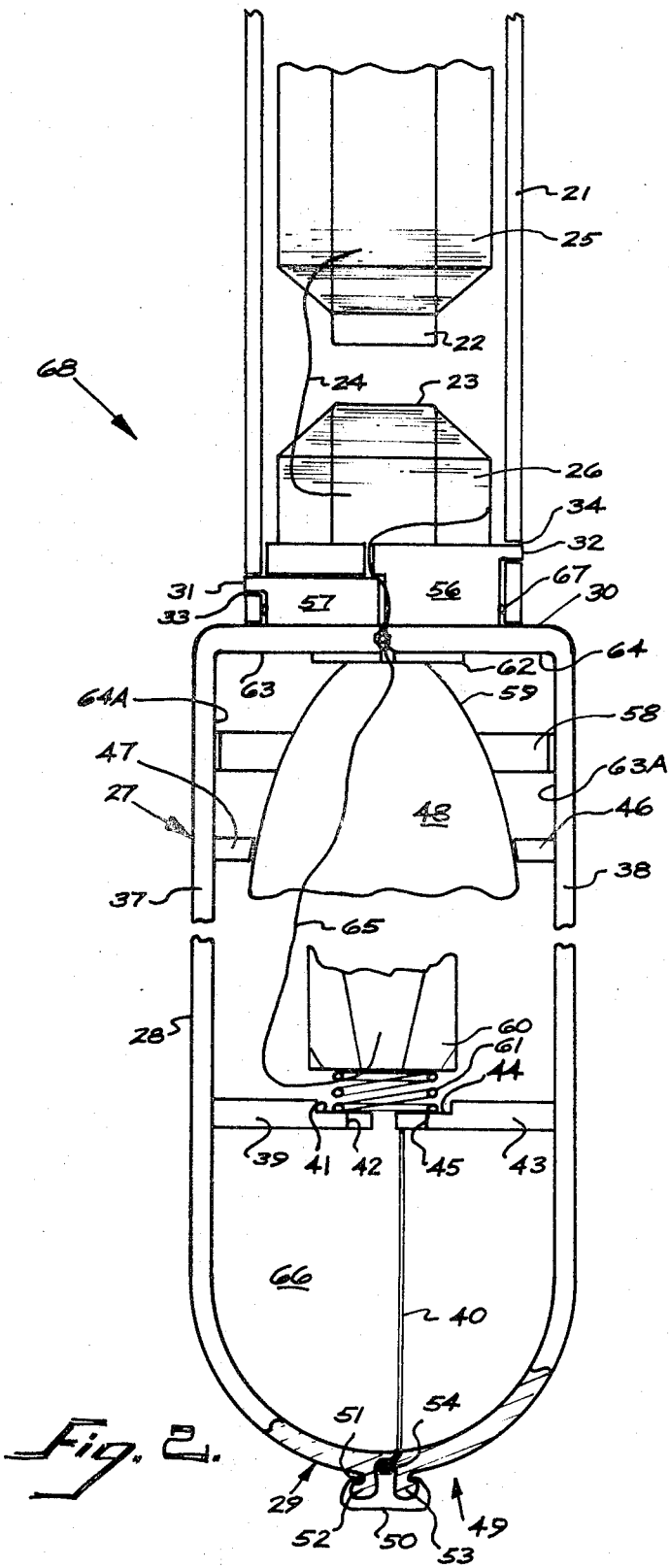

The invention will be more clearly understood from the following description of a specific embodiment of the invention together with an accompanying drawing in which:

FIG. 1 is a partial sectional elevation of an embodiment of the present invention; and FIG. 2 is a partial sectional elevation view of another embodiment of the present invention.

Referring to FIG. 1, when the present device is assembled, a latch 1 is engaged in a keeper 2 which keeper is attached to a nose 3 of a bathythermograph probe 4, and spring means such as helical spring 5 is compressed to a valve controlled by its deflection and gradient. Since the spring load of spring 5 may be predetermined, said load is greater than the weight of the bathythermograph probe 4 and latch 1, and spring 5 retains the bathythermograph probe 4 against a float 6. In the latched condition, as shown in FIG. 1, the length of latch 1, latch keeper 2 and float 6 insure that O-ring 7 and O-ring 8 are engaged such that an actuator 9 and the forward face of the bathythermograph probe are sealed to float 6. Probe 4, in one embodiment of the present invention shown in FIG. 1, has its forward face closed.

Upon being subjected to a hydrostatic pressure such as would occur upon release from a submarine, the pressure on O-rings 7 and 8 move latch 1 and latchkeeper 2 toward one another, thereby removing the load on latch 1. The natural position of latch 1 is biased away from keeper 2. Thus, latch 1 is free to disengage upon influencing the present device by a hydrostatic pressure.

Once latch 1 is disengaged, the nose 3 of the bathythermograph probe is held to float 6 by water pressure acting on the effective diameter of O-ring 8. Nose 3 will stay attached as long as the product of the O-ring area times the exerted pressure is greater than the underwater weight of the bathythermograph probe, plus the hydrodynamic drag of the bathythermograph probe 4.

At end 10 of float 6 the same water pressure, plus a hydrodynamic pressure, acts upon the effective diameter of O-ring 7 and thereby holds actuator 9 against the biasing force of spring 5. Because the force balance on end 10 of float 6 occurs at greater pressures than on the bathythermograph nose end, the float 6 separates from the bathythermograph probe 4 as the pressure decreases, after actuator 9 has released.

Therefore, by proper selection of the gradient on O-rings 7 and 8, the design of latch 1 and keeper 2, and the preload placed on the O-rings during assembly, the depth or pressure at which the present device unlatches and "activates" itself can be controlled and predetermined. By proper selection of the preload of spring 5 and the diameter of O-rings 7 and 8, the pressure of depth at which float 6 fills can be and is controlled and predetermined.

Upon spring 5 opening actuator 9, water will enter float 6. This will cause the differential pressure across O-ring 8 to rapidly decrease and fail to exert a retaining force greater than the weight of the bathythermograph probe 4 in water. The bathythermograph probe will then separate from float 6 and descend.

When the bathythermograph nose 3 has departed from float 6, float 6 will fill with water and sink, so that identification by surface ships is prevented. The material of float 6 will have a specific gravity greater than that of water.

Electrode 11 is mounted and secured to the nose 3 of the bathythermograph probe 4 and electrically isolated from same. When the electrode 11 contacts seawater which has entered float 6, it completes a circuit trigger (not shown) in a recording system aboard a submarine or other vehicle. The method of bathythermograph temperature-depth sensing and recording may be of the type described by U.S. Pat. No. 3,221,556 to Campbell et al.

In preferred embodiments of the present invention, a guard ring 12 is disposed around and concentric with actuator 9 so as to protect same and prevent premature actuation. An intake port 13 permits seawater to enter float 6 upon actuator 9 being actuated. Sensor 14 is shown in FIG. 1 to be mounted on the bathythermograph nose 3 and provides means for electrically recording predetermined responses. Lower end of float 6 which surrounds bathythermograph probe 4 acts as a protection shroud. Open end 15 permits the probe to separate from float 6. The separating wall between latch 1 and probe 4 serves as a guide for the forward portion of probe 4.

In another preferred embodiment of the present invention shown in FIG. 2, a canister 21 having a circular cross section houses stationary spool 22 and intermediary spool 23. Wire 24 is wound continuously in spinning reel configuration upon spools 22 and 23 such that wire 24 may be freely payed out from both spools. Windings 25 and 26 are shown in FIG. 2 on spools 22 and 23, respectively.

A two-piece molded glass pressure vessel 27 having a cylindrical center portion 28 and a hemispherical end 29 and a planar end 30. Vessel 27 is detachably secured to canister 21 via protuberances 31 and 32, which form part of extensions 56 and 57, extending into holes 33 and 34 in canister 21. Vessel 27 comprises two half portions, half 37 and half 38, which are assembled prior to deployment such that a longitudinal seam 40 extends around the vessel.

Half portion 37 is formed with integral member 39 which extends perpendicularly with respect to the outermost portions of half 37. Member 39 is formed with recessed surface 41 and cutout 42. Similarly, half portion 38 is formed with integral member 43 having recessed portions 44 and cutout 45. Member 43 is a mirror image of member 39.

Portions designated numeral 46 and 47 represent a spacer which restrains probe 48 from moving with respect to vessel 27 prior to deployment and during shipment of the assembly.

Half portions 37 and 38 are detachably joined at end 49 of vessel 27 by means of spring clip 50. Clip 50 engages recesses 51 in protuberances 52 and 53, the latter protuberances extending away from and being integral with halves 37 and 38. A sealing O-ring 54 is compressed into longitudinal seam 40 and, as such, extends around the vessel between halves 37 and 38 in order to form a seal therebetween. O-ring 54 is in a compressed state upon protubrances 52 and 53 of halves 37 and 38, respectively, being brought into juxtaposition such that clip 50 is placed as shown in FIG. 2.

At end 30 of vessel 27, which is opposite end 49, portion 56 extends from half 38 into canister 21, and portion 57 of half 37 similarly extends into canister 21. Protuberances 31 and 32 are integral with portions 57 and 56 respectively and are biased away from each other and into holes 33 and 34 by means of compression spring 58, which bears against the inside of walls 63A and 64A of halves 37 and 38.

Probe 48, having a nose portion 59 and a tail portion 60, is detachably secured within vessel 27 by having tail portion 60 engage a helical compression spring 61 which is compressed between tail portion 60 and surfaces 41 and 44. Spring 61 urges probe 48 toward and into contact with substantially planar retaining member 62 which is in contact with inner surfaces 63 and 64 of half portions 37 and 38, respectively.

Wire 24 is shown as being continuous with wire 65 by passing from winding 26 between portions 56 and 57 and thereafter around probe 48 into the tail portion 60 of the latter, and thereafter onto a spool in spinning reel configuration within probe 48.

A ring 67 is provided in the annular space between the inner surface of canister 21 and the outer surfaces of portions 56 and 57. Ring 67 is normally compressed between the canister and portions 56 and 57 due to the radially outward biased tendency of spring 58. However, upon the pressure vessel defined by halves 37 and 38 being subjected to an external hydrostatic pressure, such hydrostatic pressure will bias halves 37 and 38 toward one another against the radial force of spring 58. Ring 67 insures that protuberances 31 and 32 will leave holes 33 and 34, thereby permitting separation of the pressure vessel from the canister. In the absence of ring 67, it is possible that either of the protuberances would bind in a hole despite the fact that the distance between their diametrically opposed extremities is less than the inside diameter of canister 21. Ring 67 eliminates this problem.

In operation, the entire canister-pressure vessel assembly 68, as shown in FIG. 2, is subjected to hydrostatic pressure as would be the case where assembly 68 is used with a submerged submarine. If, for example, the assembly 68 is mounted in a torpedo tube which is thereafter flooded, the hydrostatic pressure will result in circumferential compression of pressure vessel 27, thereby causing portions 56 and 57 to move toward each other against the radially directed force exerted by spring 58. This movement results in protuberances 31 and 32 withdrawing from holes 33 and 34, respectively, such that positive buoyancy created by air within pressure vessel 27 will cause pressure vessel 27 to separate from canister 21. Vessel 27 containing probe 48 ascends within the body of fluid in which it is deployed such that wire 24 is payed out from spool 23 and its associated winding 26. It is within the scope of the present invention that wire 24 be simultaneously payed out from both windings 25 on spools 22 and 26 such that little or no stress is induced in wire 24 along its longitudinal axis. Upon pressure vessel 27 reaching a predetermined depth, the hydrostatic pressure of the fluid at this depth will balance the ratio force exerted by spring 58 such that subsequent ascending of vessel 27 will result in an associated decrease in hydrostatic pressure which will result in separation of half portion 37 from half portion 38 along seam 40. Fluid will enter pressure vessel 27 and thereby eliminate the positive buoyancy of vessel assembly 27 caused by air or a fluid of lighter density within vessel 27.

Probe 48, having a negative buoyancy, will fall or descend through the fluid after being separated from half portions 37 and 38 and will measure a property of the fluid, such as temperature, versus depth or fluid. Half portions 37 and 38 and all associated apparatuses shown in FIG. 2 have negative buoyancies such that they will fall to the bottom of the fluid without detection from the surface of the fluid.

It is within the scope of the present invention to have spring clip 50 separate from protuberances 52 and 53 upon assembly 68 being subjected to hydrostatic pressure, however, it is further within the scope of this invention to have spring clip 50 detachably secured to vessel 27 until separation at a selected depth occurs.

During descent of probe 48, wire 65 is freely payed out from within probe 48 such that little or no stress is induced along the longitudinal axis of wire 65.

The embodiment of the invention particularly disclosed is presented merely as an example of the invention. Other embodiments, forms and modifications of the invention coming within the proper scope of the appended claims

What is claimed is:

1. In an expendable bathythermograph probe assembly for measuring and recording a property of water such as temperature, a float housing having formed therein a first and a second chamber, said first and second chambers being separated by an interior wall having formed therein an aperture communicating with both said chambers, said second chamber being further bounded by an open end of said housing opposite said interior wall, said first chamber communicating with an inlet port formed within an actuator end wall; a bathythermograph probe disposed within said second chamber such that a forward portion of said probe extends through said aperture and into said first chamber; keeper means for retaining a latch secured to said forward portion within said first chamber; sealing means for sealing said first chamber from said second chamber and comprising an O-ring disposed around and in contact with said forward portion; electrical sensing means for detecting a property of water, said sensing means disposed on said forward portion withing said first chamber such that said electrical means are activated only upon fluid entering said first chamber through said inlet port; and actuating means for releasing said probe from said housing, said activating means comprising, an actuating member having a rod-like portion and having formed therein a hollow portion around and coaxial with said rod-like portion, said rod-like portion extending through said inlet port and into said first chamber, a latch secured to said rod-like portion and extending to and communicating wtih said keeper means when in a latched condition, said latch biased away from said keeper, helical spring means for retaining said latch in said keeper and disposed within said hollow portion, sealing means for preventing fluid from entering said first chamber through said inlet port.

2. In an apparatus of the type adapted to ascend upon release from an object submerged in liquid and to release a ballistic measuring probe for descent in said fluid upon reaching a predetermined depth, said apparatus being of the type comprising float means for providing said apparatus with a positive buoyancy and sealed aperture means operative at said predetermined depth to flood said float means to overcome said positive buoyancy and effect release of said ballistic measuring probe, the improvement wherein said apparatus further comprises mechanical means connected to hold said sealed aperture means inoperative to permit storage, shipment and handling of said apparatus, and pressure responsive means for releasing said mechanical means upon the subjecting of said apparatus to external hydrostatic pressures corresponding to the depth of said object in said liquid.

3. An apparatus for being deployed from an object submerged in a liquid, comprising a ballistic measuring probe having a negative buoyancy and including information sensing means, float means releasably connected to said probe and providing said apparatus with a positive buoyancy whereby said apparatus ascends upon release of said object, said float means having an internal chamber communicating with the external surface of said probe, releasable sealing means communicating with said external surface for preventing said liquid from between said chamber, said sealing means being held in sealing relation with said surface by the pressure in said chamber at external pressures corresponding to the depth of said object in said liquid and being released at a lesser external pressure to permit entry of said liquid to said chamber and separation of said probe from said apparatus, whereby said apparatus has a negative buoyancy when said liquid fills said chamber, mechanical means connected to hold said sealing means in sealing relationship with said external surface, and pressure responsive means connected to said mechanical means at external pressures greater than a predetermined pressure, whereby said mechanical means is automatically released when said apparatus is deployed from said object below a given depth in said liquid.

4. The apparatus of claim 3 wherein said float means comprises a housing having a first aperture, one surface of said probe being positioned adjacent said aperture, said sealing means comprises a sealing ring means between said surface of said probe and surrounding said aperture, and said mechanical means comprises latch means in said chamber affixed to said surface of said probe.

5. The apparatus of claim 4 comprising a second aperture in said housing, wherein said pressure responsive means comprises actuator means releasably sealed in said second aperture, means connecting said actuator means to said latch means, and spring means acting on said actuator means for holding said latch means in unreleased state, whereby external pressure above a predetermined magnitude acting on said actuator means against the force of said spring means effects the release of said latch means.

6. The apparatus of claim 3 wherein said float means comprises a hollow body formed of first and second substantially identical half portions, said sealing means comprising sealing ring means positioned between adjoining edges of said first and second half portions, said probe means being releasably mounted within said chamber.

7. The apparatus of claim 6 wherein said first and second half portions have externally extending extensions, said mechanical means comprising cylindrical means positioned to surround said extensions for holding said first and second portions together, and said pressure responsive means comprises spring means within said chamber for urging said extensions in holding relation to said mechanical means, whereby external pressure of said apparatus above a predetermined magnitude opposing said spring means effects the release of said mechanical means.

References Cited

UNITED STATES PATENTS

| 2,978,690 | 4/1961 | Kurie et al. | 73—170 |
| 3,221,556 | 12/1965 | Campbell | 73—362 |
| 3,339,407 | 9/1967 | Campbell | 73—170 |
| 3,349,613 | 10/1967 | Francis | 73—170 |

FOREIGN PATENTS 148,259  11/1962  Russia.

LOUIS R. PRINCE, Primary Examiner

W. A. HENRY II, Assistant Examiner

U.S. Cl. X.R.

73—170